US012594969B2

(12) United States Patent
Hayashi et al.

(10) Patent No.: US 12,594,969 B2
(45) Date of Patent: Apr. 7, 2026

(54) VEHICLE CONTROLLER, METHOD, AND PROGRAM FOR STEERING REACTION DURING MANUAL DRIVING FOR RETURNING TO A PRESET ROUTE

(71) Applicant: TOYOTA JIDOSHA KABUSHIKI KAISHA, Toyota (JP)

(72) Inventors: Yusuke Hayashi, Atsugi (JP); Taichi Kawanai, Susono (JP); Daichi Hotta, Tokyo (JP); Sadayuki Abe, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 18/522,696

(22) Filed: Nov. 29, 2023

(65) Prior Publication Data

US 2024/0208550 A1 Jun. 27, 2024

(30) Foreign Application Priority Data

Dec. 27, 2022 (JP) ................................. 2022-210552

(51) Int. Cl.
*B60W 60/00* (2020.01)

(52) U.S. Cl.
CPC ..... *B60W 60/0053* (2020.02); *B60W 2540/18* (2013.01); *B60W 2710/202* (2013.01)

(58) Field of Classification Search
None
See application file for complete search history.

(56) References Cited

U.S. PATENT DOCUMENTS

| | | | |
|---|---|---|---|
| 2010/0228438 A1 | 9/2010 | Buerkle et al. | |
| 2010/0280713 A1* | 11/2010 | Stahlin | B60W 50/16 701/1 |
| 2015/0344029 A1* | 12/2015 | Silvlin | B60W 30/08 701/36 |
| 2016/0209841 A1* | 7/2016 | Yamaoka | B60W 30/00 |
| 2017/0225711 A1* | 8/2017 | DeCia | B62D 15/025 |
| 2017/0334441 A1 | 11/2017 | Sen et al. | |
| 2018/0065635 A1* | 3/2018 | Urano | B60W 50/10 |
| 2021/0080943 A1* | 3/2021 | Iwamoto | G01C 21/3407 |
| 2022/0111891 A1 | 4/2022 | Takeuchi et al. | |

FOREIGN PATENT DOCUMENTS

| | | |
|---|---|---|
| JP | 2001-151137 A | 6/2001 |
| JP | 2010-513123 A | 4/2010 |
| JP | 2017-207967 A | 11/2017 |
| JP | 2020-125062 A | 8/2020 |

* cited by examiner

*Primary Examiner* — James J Lee
*Assistant Examiner* — Tawri M McAndrews
(74) *Attorney, Agent, or Firm* — Dinsmore & Shohl LLP

(57) ABSTRACT

The vehicle controller of the present disclosure acquires a preset operation route, and causes the vehicle to travel along the preset operation route in one of an autonomous driving mode and a manual driving mode. The autonomous driving mode is a mode in which the vehicle is operated by autonomous driving. The manual driving mode is a mode in which the vehicle is operated by manual driving in which at least steering is manually performed. The vehicle controller of the present disclosure generates steering torque in a direction of returning the vehicle to the preset operation route in response to detection of steering toward a road deviating from the preset operation route during operation in the manual driving mode.

5 Claims, 6 Drawing Sheets

VEHICLE CONTROLLER, METHOD, AND PROGRAM FOR STEERING REACTION DURING MANUAL DRIVING FOR RETURNING TO A PRESET ROUTE

CROSS-REFERENCE TO RELATED APPLICATION

The present application claims priority under 35 U.S.C. § 119 to Japanese Patent Application No. 2022-210552, filed Dec. 27, 2022, the contents of which application are incorporated herein by reference in their entirety.

BACKGROUND

Field

The present disclosure relates to a controller, a method, and a program for controlling a vehicle operated along a preset operation route.

Background Art

Examples of documents indicating the technical level in the technical field related to the present disclosure include JP2010-513123A and JP2001-151137A. For example, JP2010-513123A discloses a method for generating a target trajectory adapted to a surrounding situation and adjusting a steering system so that a vehicle follows the target trajectory. According to the method, a permissible travel path is assigned to the target trajectory and basic steering torque is generated which guides the vehicle along the permissible travel path. If the vehicle leaves the permissible travel path, steering guidance torque acting on the vehicle in the direction of the permissible travel path is superimposed on the basic steering torque.

SUMMARY

By the way, in a vehicle where manual operation by a driver is allowed, steering may be performed toward a road that deviates from an operation route. The techniques described in the above patent documents are techniques for operating a vehicle at a preferable position in a lane by assistance for steering, but are not techniques for preventing the vehicle from deviating from an operation route.

The present disclosure has been made in view of the above problem. An object of the present disclosure is to prevent a vehicle from traveling toward a road deviating from a preset operation route when the vehicle is operated by manual driving.

The present disclosure provides a vehicle controller, a vehicle control method, and a vehicle control program as a vehicle control technique for achieving the above object.

The vehicle controller of the present disclosure includes at least one processor and a memory communicatively coupled to the at least one processor and storing a plurality of executable instructions. The plurality of executable instructions is configured to cause at least one processor to perform the following processing. The processing includes acquiring a preset operation route, causing the vehicle to travel along the operation route in one of an autonomous driving mode and a manual driving mode, and generating steering torque in a direction of returning the vehicle to the preset operation route in response to detection of steering toward a road deviating from the preset operation route during operation in the manual driving mode. The autonomous driving mode is a mode in which the vehicle is operated by autonomous driving, and the manual driving mode is a mode in which the vehicle is operated by manual driving in which at least steering is manually performed by a driver.

The vehicle control method of the present disclosure is a method for controlling a vehicle by a computer. The vehicle control method includes acquiring a preset operation route, causing the vehicle to travel along the preset operation route in one of an autonomous driving mode and a manual driving mode, and generating steering torque in a direction of returning the vehicle to the operation route in response to detection of steering toward a road deviating from the preset operation route during operation in the manual driving mode.

The vehicle control program of the present disclosure is configured to cause a computer to perform the vehicle control method described above. In other words, the vehicle control program of the present disclosure is configured to cause a computer to function as the vehicle controller described above by being executed by the computer. The vehicle control program of the present disclosure may be stored in a non-transitory computer-readable storage medium or may be provided via a network.

According to the vehicle control technique of the present disclosure, the autonomous driving mode may be switched to the manual driving mode in response to detection of intervention in steering by the driver during operation in the autonomous driving mode. In this case, the generation of the steering torque in the direction of returning the vehicle to the preset operation route may be suppressed until a preset time elapses from the detection of the intervention or until the vehicle moves a preset distance from the detection of the intervention. According to this, when the driver intentionally intervenes in steering, the generation of steering resistance that disturbs the driver's intention is suppressed.

According to the vehicle control technique of the present disclosure, when the driver performs steering toward a road deviating from the preset operation route during operation in the manual driving mode, the steering torque in the direction of returning the vehicle to the preset operation route is generated. Thus, when the vehicle is operated along the preset operation route, the vehicle is prevented from traveling on a road deviating from the preset operation route during the operation by manual driving.

DETAILED DESCRIPTION

1. Premise

The vehicle control method according to the embodiment of the present disclosure is applied to a vehicle capable of autonomous driving at level 2 or higher in the definition of the autonomous driving level of the SAE. Hereinafter, the vehicle according to the present embodiment means a vehicle capable of performing autonomous driving to which the vehicle control method according to the present embodiment is applied.

Figure 1:
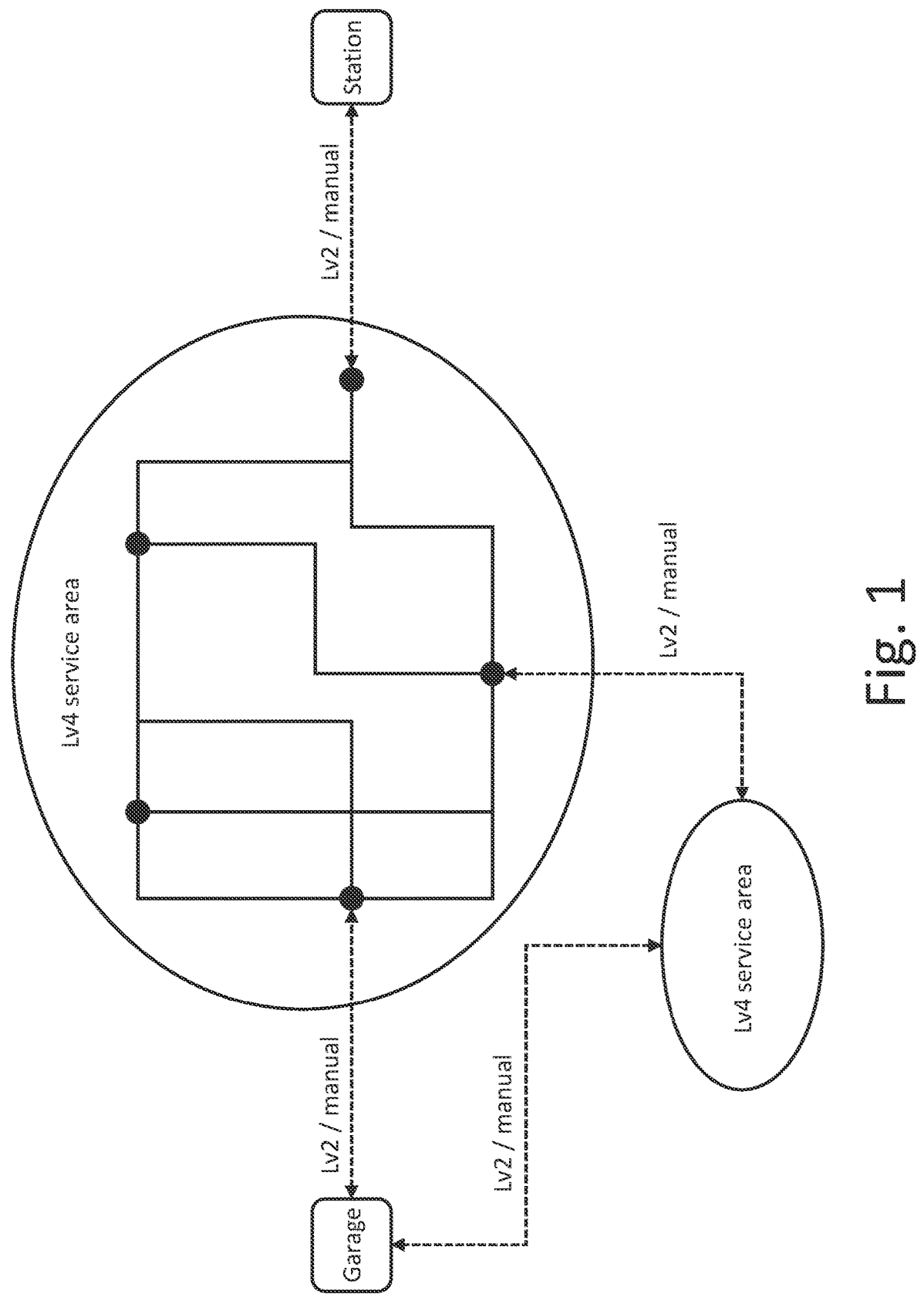
FIG. 1 is a diagram illustrating an operation area of a vehicle according to an embodiment of the present disclosure.

The vehicles according to the present embodiment are used to provide a transport service by autonomous driving in an area (hereinafter referred to as an Lv4 service area) in which a traveling environment condition for autonomous driving of level 4 is satisfied. That is, the vehicle according to the present embodiment is a vehicle capable of autonomous driving at level 4. However, as shown in FIG. 1, the Lv4 service area is a limited area, and there are many cases where garages in which vehicles are parked and transfer points with surrounding transportation facilities such as stations are located outside the Lv4 service area. Further, the Lv4 service area does not exist as one continuous area, but a plurality of Lv4 service areas exist discretely. In sections connecting garages, stations, and the like to Lv4 service areas and sections connecting two Lv4 service areas, operation routes for operating vehicles are set. The vehicles according to the present embodiment move on the operation route outside the Lv4 service area by autonomous driving or manual driving at level 2.

In the Lv4 service area, since the subject of driving the vehicles is the vehicles themselves, there is no possibility of making a wrong road. In the autonomous driving at level 2, steering is assisted. If an operation route leading to the Lv4 service area is set as the target route, steering is autonomously performed so as to move the vehicle along the operation route. Therefore, it may be considered that there is no possibility that the vehicle enters a road deviated from the operation route while the driver receives the support by the autonomous driving of level 2.

However, when the driver intervenes in the steering for some reason, the autonomous driving at level 2 is cancelled and can be switched to the manual driving. In general, in the manual driving after the autonomous driving of level 2 is cancelled, steering is performed according to the driver's judgment, and thus there is a concern that a wrong road may occur. Incorrect routes cause delays in the operation. In an area outside the Lv4 service area, localization based on map information is performed in order to detect entry into the Lv4 service area. However, if the vehicle enters a road without map information by mistake, it is necessary to perform localization again.

2. Vehicle Control Method 2-1. During Operation in Manual Driving Mode

In the following description, a mode in which the vehicle is operated by autonomous driving at level 2 is referred to as an autonomous driving mode, and a mode in which the vehicle is operated by manual driving is referred to as a manual driving mode. In the vehicle control method according to the present embodiment, during traveling in the manual driving mode, the driver's free steering is not allowed, but a restriction is applied to the steering to prevent the vehicle from traveling on a road that deviates from the operation route. Hereinafter, the steering control performed during operation in the manual driving mode will be specifically described with reference to FIG. 2A and FIG. 2B.

Figure 2B:
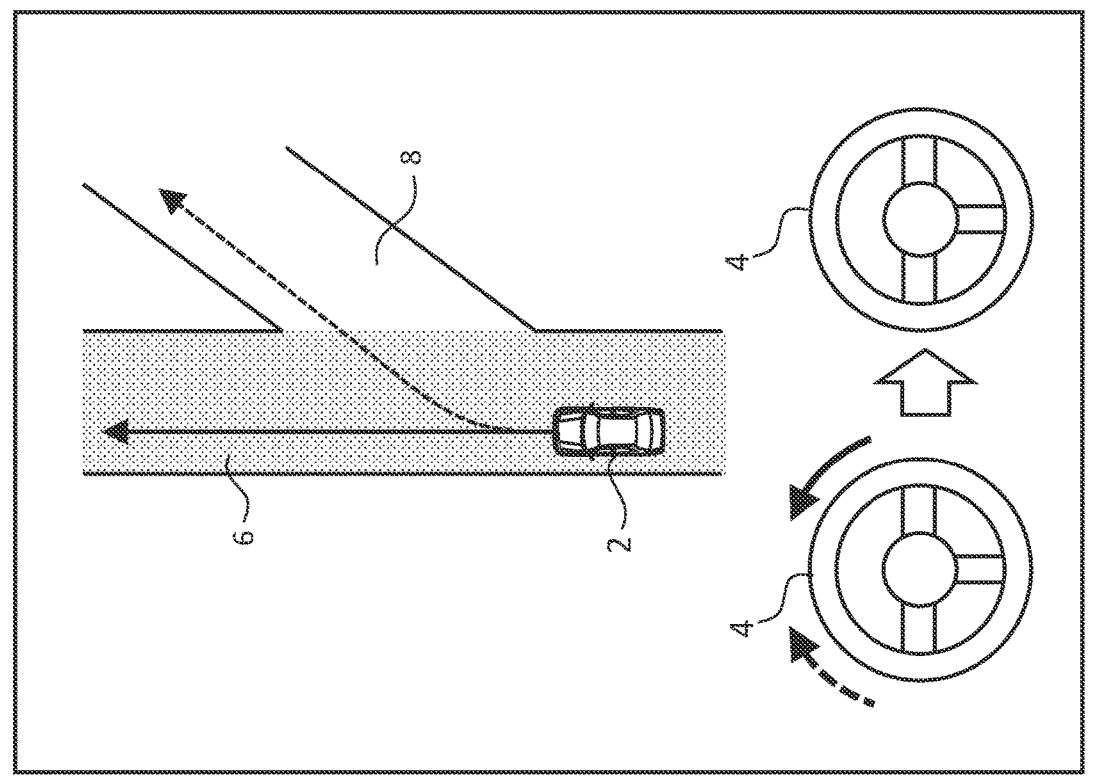
FIG. 2B is a diagram illustrating steering control performed during operation in the manual driving mode according to the vehicle control method according to the embodiment of the present disclosure.
Figure 2A:
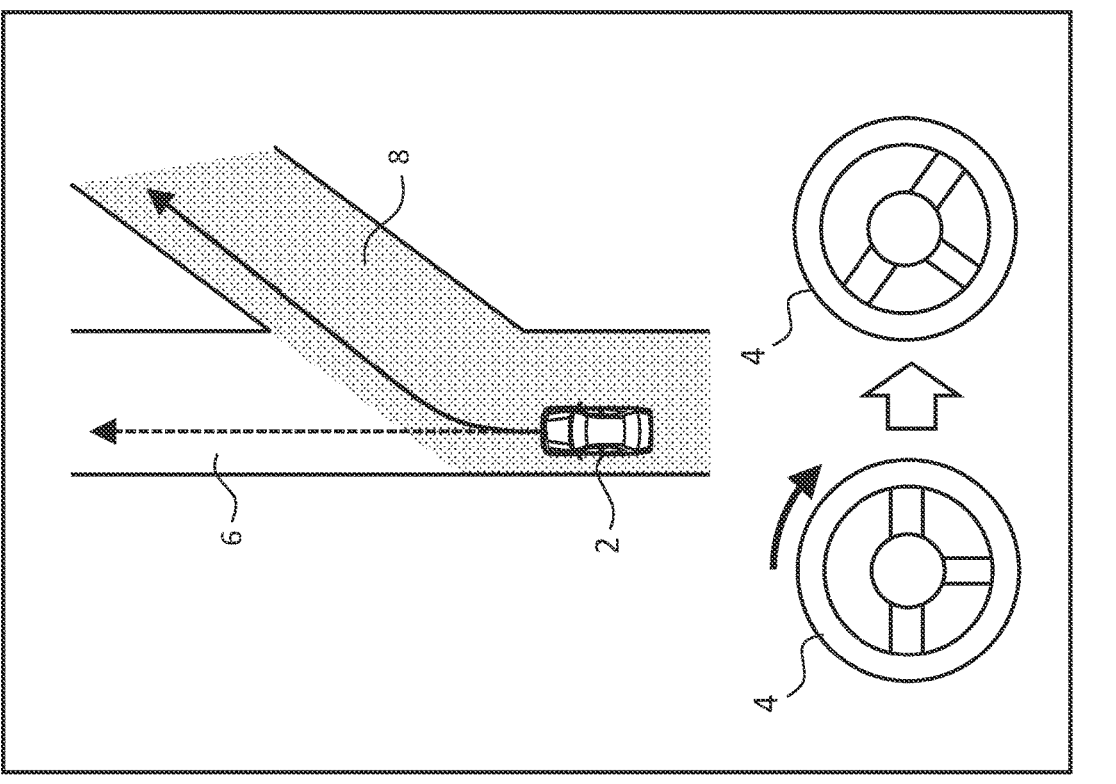
FIG. 2A is a diagram illustrating steering control performed during operation in the manual driving mode according to the vehicle control method according to the embodiment of the present disclosure.

In FIGS. 2A and 2B, the vehicle control method according to the present embodiment is applied to a vehicle 2. The vehicle 2 is operated in the manual driving mode and is approaching a point at which the branch road 8 branches off to the right from the main road 6. In the case shown in FIG. 2A, the branch road 8 is the operation route of the vehicle 2, and the main road 6 beyond the branch point is a road that deviates from the operation route. In the case shown in FIG. 2B, the main road 6 is the operation route of the vehicle 2, and the branch road 8 is a road that deviates from the operation route.

In the case shown in FIG. 2A, in order to drive the vehicle 2 along the driving route, the vehicle 2 must be driven towards the branch road 8. The steering amount expected for the vehicle 2 to proceed to the branch road 8 can be calculated from the map information, specifically, the road shape of the branch point at which the branch road 8 branches off from the straight road 6 and the attitude of the vehicle 2. When the steering amount by the manual operation of the driver satisfies the expected steering amount, the vehicle 2 proceeds to the branch road 8 along the operation route.

However, when the steering amount by the manual operation is different from the expected steering amount, specifically, when the steering in the right direction is not performed and the current steering amount is maintained, the vehicle 2 continues to travel on the main road 6 and deviates from the operation route. Therefore, in such a case, a clockwise steering torque is applied to the vehicle steering device operated by the driver, specifically, the steering wheel 4. The application of the steering torque urges the driver to steer the vehicle 2 rightward, and the driver operates the steering wheel 4 so as to move the vehicle 2 to the branch road 8. Thus, the vehicle 2 is prevented from deviating from the operation route. In a case where the branch road is branched to the left from the main road, a counterclockwise steering torque is applied to urge the driver to steer to the left.

In the case shown in FIG. 2B, in order to operate the vehicle 2 along the operation route, it is necessary to cause the vehicle 2 to continue to travel on the main road 6. The steering amount expected for the vehicle 2 to continue traveling on the main road 6 can be calculated from the map information, more specifically, the road shape of the main road 6 and the attitude of the vehicle 2. When the steering amount by the manual operation of the driver satisfies the expected steering amount, the vehicle 2 continues to travel on the main road 6 along the operation route.

However, when the steering amount by the manual operation is different from the expected steering amount, specifically, when the steering in the right direction is performed without maintaining the current steering amount, the vehicle 2 moves toward the branch road 8 and deviates from the operation route. Therefore, in such a case, a counterclockwise steering torque is applied to the steering wheel 4 so as to counteract the clockwise steering torque applied to the steering wheel 4 by the driver. This steering torque acts as resistance when the driver operates the steering wheel 4 to steer the vehicle 2 in the right direction, and urges the driver to maintain the current steering amount. Thus, the vehicle 2 is prevented from deviating from the operation route. In the case where the branch road is branched to the left from the main road, the counterclockwise steering torque is applied so as to act as resistance against the leftward steering by the driver.

As described above, in the vehicle control method according to the present embodiment, during the operation of the vehicle 2 in the manual driving mode, the steering torque for the steering assist is generated according to a rule different from that during the operation of the vehicle 2 in the autonomous driving mode. In the autonomous driving mode, steering torque for steering assist is generated so that the vehicle 2 travels along the target trajectory. The target trajectory is a trajectory through which the vehicle 2 should pass in order to cause the vehicle 2 to travel along the operation route, and is set on the basis of information on obstacles around the vehicle 2. On the other hand, the steering torque generated in the manual driving mode is intended to prevent the driver from selecting a road different from the driving route. Therefore, in the manual driving mode, in a case where the vehicle 2 is about to move to a road that deviates from the operation route at a place where there are a plurality of road options such as a branch point or an intersection, steering torque in a direction to return the vehicle 2 to the operation route is generated.

2-2. Immediately After Switching of Driving Mode

When the driver intervenes in steering in the autonomous driving mode, switching from the autonomous driving mode to the manual driving mode is performed. The intervention in the steering by the driver is performed, for example, when a road different from the operation route is selected by a clear intention of the driver. If the above-described steering torque is generated at this time, the driver cannot operate the steering wheel 4 as he or she desires, and there is a possibility that the intervention operation is hindered.

As a measure against the above problem, in the vehicle control method according to the present embodiment, when the driver's intervention in the steering is detected in the autonomous driving mode, the application of the steering torque for the steering assist is stopped until a preset time elapses. Hereinafter, in the vehicle control method according to the present embodiment, to the manual driving mode in the vehicle control method according to the present embodiment will be specifically described with reference to FIG. 3.

Figure 3:
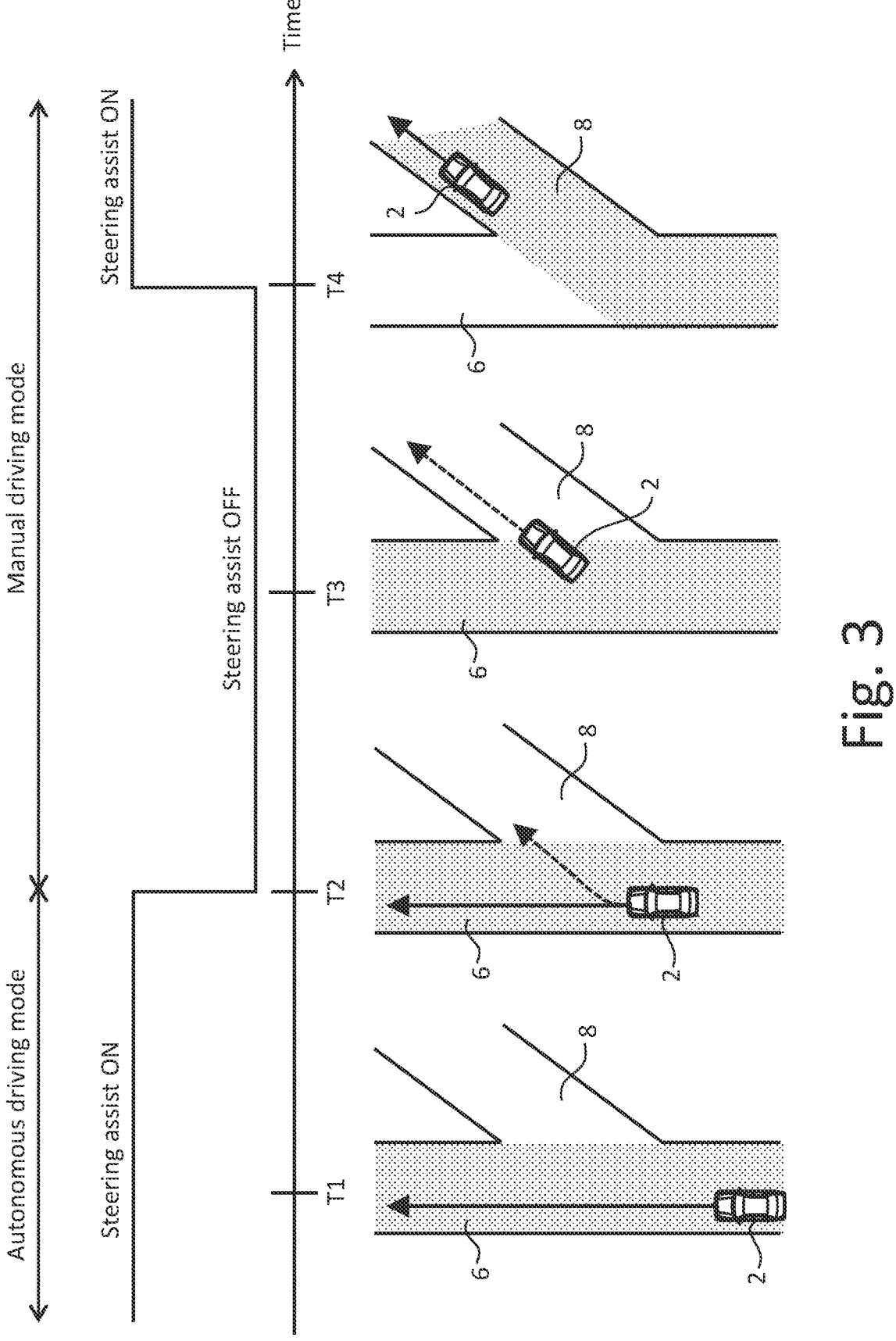
FIG. 3 is a diagram illustrating steering control performed immediately after switching from the autonomous driving mode to the manual driving mode in the vehicle control method according to the embodiment of the present disclosure.

In FIG. 3, the state of the vehicle 2 during operation is depicted in time series. At time T1, the vehicle 2 is traveling on the main road 6 in the autonomous driving mode. In the autonomous driving mode, steering assistance is performed so as to cause the vehicle 2 to travel along a target trajectory set on the operation route.

At time T2, the driver operates the steering wheel 4 to direct the vehicle 2 toward the branch road 8. That is, the driver intervenes in the steering. The driving mode is switched from the autonomous driving mode to the manual driving mode in response to an intervention from the driver. At the same time as the operation mode is switched to the manual operation mode, a timer set to a preset time (for example, several seconds to several tens of seconds) is started.

At time T3, the vehicle 2 deviates from the main road 6, which is an operation route, and advances toward the branch road 8. However, until the value of the timer becomes 0, the steering torque in the direction of returning the vehicle 2 to the operation route is not applied even when the vehicle 2 is out of the operation route. That is, the steering assist for the manual driving mode is turned off until the value of the timer becomes 0 from the preset time.

At time T4, the value of the timer becomes 0. Thereafter, the steering assist for the manual driving mode is turned on. Therefore, when the vehicle 2 is about to move to a road that deviates from the operation route, steering torque in a direction to return the vehicle 2 to the operation route is generated. Before the value of the timer becomes 0, the navigation device searches again for an operation route to the destination and sets a new operation route passing through the branch road 8.

Since the steering control as described above is performed immediately after the switching of the driving mode, the generation of the steering resistance disturbing the intention of the driver is suppressed with respect to the intentional intervention of the driver in the steering.

2-3. Flowchart

Figure 4:
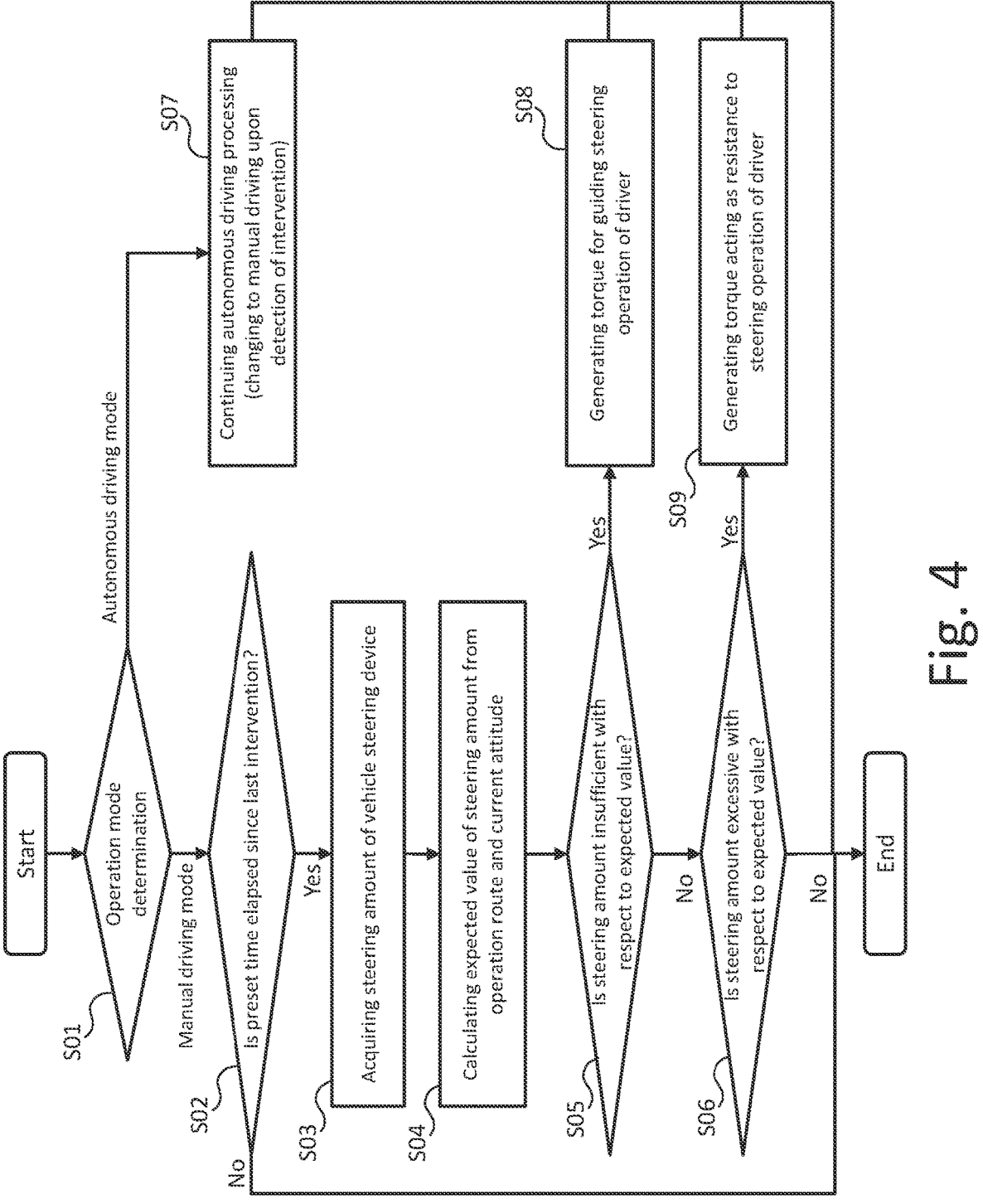
FIG. 4 is a flowchart illustrating a procedure of the vehicle control method according to the embodiment of the present disclosure.

The procedure of the vehicle control method according to the present embodiment can be shown by a flowchart. FIG. 4 is a flowchart illustrating a procedure of the vehicle control method according to the present embodiment.

In step S01, the driving mode of the vehicle 2 is determined. When the current driving mode is the autonomous driving mode, the procedure proceeds to step S07.

In step S07, the processing of the autonomous driving of level 2 is continued. When the driver's intervention in steering is detected during operation in the autonomous driving mode, the driving mode is changed from the autonomous driving mode to the manual driving mode. After step S07 is performed, the procedure ends.

If it is determined in step S01 that the current driving mode is the manual driving mode, the procedure proceeds to step S02.

In step S02, it is determined whether or not a preset time has elapsed from the immediately preceding intervention by the driver in the steering. That is, it is determined whether or not a preset time has elapsed since switching from the autonomous driving mode to the manual driving mode. If the preset time has not elapsed, the procedure ends without performing the remaining steps.

If it is determined in step S02 that the preset time has already elapsed, the procedure proceeds to step S03.

In step S03, a steering amount of the vehicular steering device is acquired. A specific example of the vehicle steering device is the steering wheel 4, and a specific example of the steering amount is a steering angle. Next, the procedure proceeds to step S04.

In step S04, the expected value of the steering amount is calculated from the road shape of the operation route and the current attitude of the vehicle 2. The expected value of the steering amount is a steering amount expected to cause the vehicle 2 to travel along the operation route. Next, the procedure proceeds to step S05.

In Step S05, the steering amount acquired in Step S03 is compared with the expected value of the steering amount calculated in Step S04 to determine whether or not the steering amount is insufficient with respect to the expected value. Specifically, when the steering amount is smaller than the expected value and the difference therebetween exceeds a threshold value A, it is determined that the steering amount is insufficient with respect to the expected value. When the steering amount is insufficient with respect to the expected value, the procedure proceeds to step S08.

In step S08, torque for guiding the driver's steering operation is generated so that the vehicle 2 follows the operation route. That is, the steering control as illustrated in FIG. 2A is performed. After step S08 is performed, the procedure ends.

When it is determined in step S05 that the steering amount is not insufficient with respect to the expected value, the procedure proceeds to step S06.

In Step S06, the steering amount acquired in Step S03 is compared with the expected value of the steering amount calculated in Step S04 to determine whether or not the steering amount exceeds the expected value. Specifically, when the steering amount is larger than the expected value and the difference therebetween exceeds a threshold value B, it is determined that the steering amount is excessive with respect to the expected value. When the steering amount is excessive with respect to the expected value, the procedure proceeds to step S09.

In step S09, torque acting as a steering resistance of the driver is generated so that the vehicle 2 moves along the operation route. That is, the steering control as illustrated in FIG. 2 is performed. After step S09 is performed, the procedure ends.

3. Vehicle Controller

Next, a vehicle controller according to the present embodiment will be described.

Figure 5:
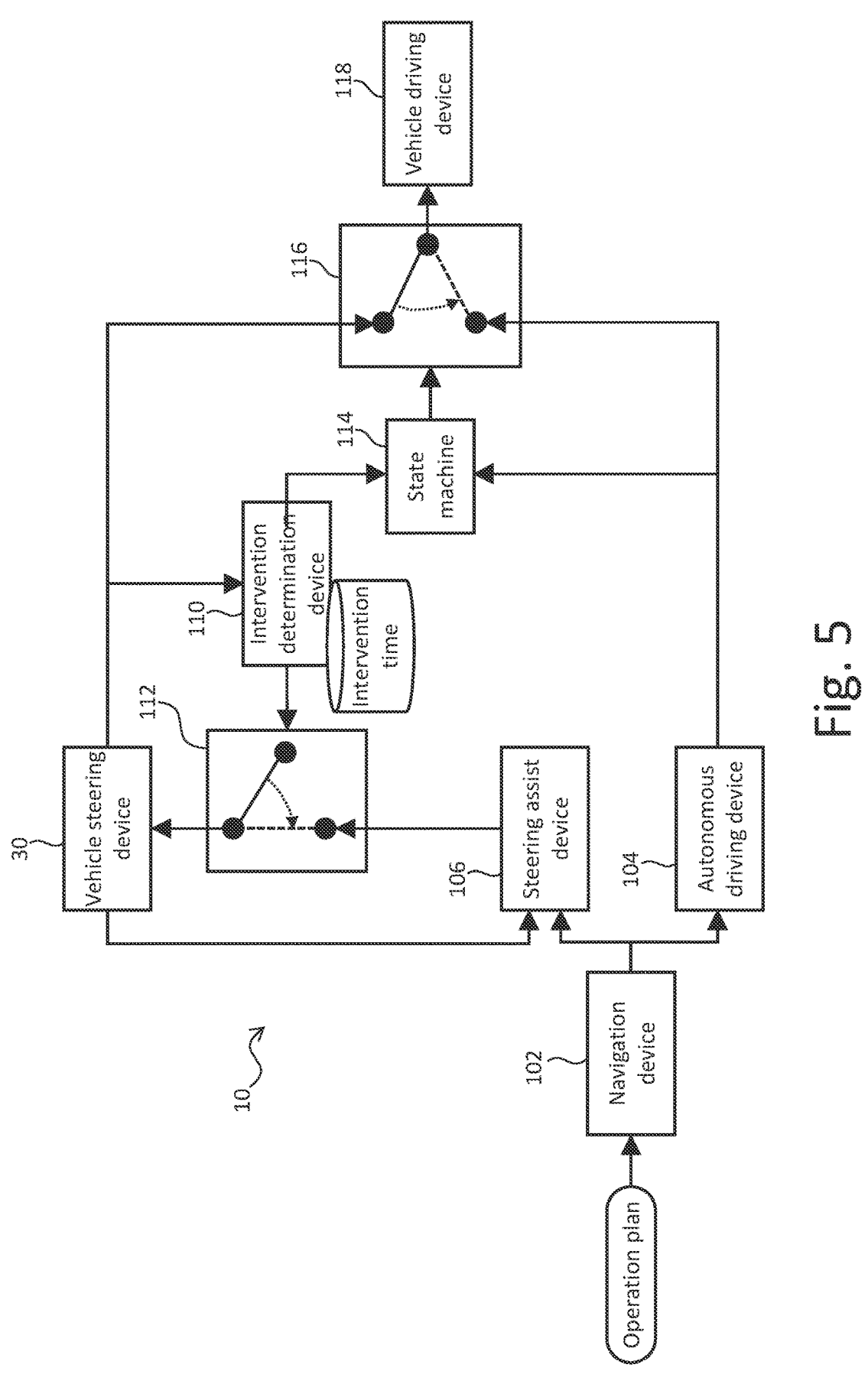
FIG. 5 is a block diagram illustrating a configuration of a vehicle controller according to the embodiment of the present disclosure.

FIG. 5 is a block diagram showing a configuration of the vehicle controller according to the present embodiment. The vehicle controller 10 according to the present embodiment is a computer that performs the above-described vehicle control method. The vehicle controller 10 includes a navigation device 102, an autonomous driving device 104, a steering assist device 106, an intervention determination device 110, a first selector 112, a state machine 114, a second selector 116, and a vehicle driving device 118. These are functions of the vehicle controller 10 that are implemented by executing preset multiple instructions by at least one processor that physically configures the vehicle controller 10.

The navigation device 102 generates an operation route based on the operation plan of the vehicle 2. The operation plan includes, for example, information such as a departure point, a scheduled departure time, a destination, a scheduled arrival time, a relay point, and a relay point passing time. The operation plan is defined in advance and registered in the memory. Alternatively, the operation plan is distributed by wireless communication from a management server that manages the operation of the vehicle 2. The navigation device 102 distributes the latest operation route to the autonomous driving device 104 and the steering assist device 106 each time the operation route is updated. The navigation device 102 may be a separate device physically independent of the vehicle controller 10.

The autonomous driving device 104 acquires sensor information from a recognition sensor mounted on the vehicle 2, and performs recognition and determination based on the sensor information. Then, based on the result of the recognition and the determination, a target trajectory along the operation route is generated. The target trajectory is represented by a target position of the vehicle 2 and a target speed or a target acceleration at the target position, and is updated every time the vehicle 2 moves. The autonomous driving device 104 transmits the target trajectory to the vehicle driving device 118. Note that the autonomous driving device 104 is always operating regardless of whether it is in the autonomous driving mode or the manual driving mode.

The steering assist device 106 calculates a steering amount expected to operate the vehicle 2 along the operation route based on the road shape of the operation route and the current attitude of the vehicle 2. Then, the actual steering amount is compared with the expected steering amount. When the actual steering amount is insufficient with respect to the expected steering amount, for example, when the vehicle 2 is likely to travel straight at a place where a right turn or a left turn is required, the steering assist device 106 urges the driver to turn right or left by applying steering torque to the vehicle steering device 30. When the actual steering amount is excessive with respect to the expected steering amount, for example, when the vehicle 2 is likely to turn right or left at a place where straight traveling is required, the steering assist device 106 urges the driver to go straight by adjusting the steering torque applied to the vehicle steering device 30 to generate steering resistance. Note that the steering assist device 106 is always operating regardless of whether it is in the autonomous driving mode or the manual driving mode.

The vehicle driving device 118 drives the vehicle 2 by operating an actuator mounted on the vehicle 2. The vehicle driving device 118 is selectively connected to one of the autonomous driving device 104 and the vehicle steering device 30. When connected to the autonomous driving device 104, the vehicle driving device 118 operates the driving actuator, the braking actuator, and the steering actuator based on the target trajectory generated by the autonomous driving device 104. When connected to the vehicle steering device 30, the vehicle driving device 118 operates the steering actuator in accordance with the steering amount input from the vehicle steering device 30. At this time, the vehicle driving device 118 operates the driving actuator and the braking actuator in accordance with the operation amount of the accelerator pedal or the brake pedal by the driver.

The intervention determination device 110 receives the steering amount from the vehicle steering device 30. When a change in the steering amount exceeding a threshold is detected, the intervention determination device 110 determines that the driver intervenes in the steering. The intervention determination device 110 records the time at which it is determined that there is intervention as an intervention time. The intervention determination device 110 notifies the first selector 112 of the determination result of the presence or absence of intervention and the intervention time. In addition, the intervention determination device 110 notifies the state machine 114 of the determination result of the presence or absence of the intervention.

The first selector 112 is provided in a transmission line of the steering torque from the steering assist device 106 to the vehicle steering device 30. The first selector 112 connects or disconnects the transmission line based on the determination result of the presence or absence of intervention and the intervention time notified from the intervention determination device 110. When it is determined that there is intervention, the first selector 112 blocks the transmission line and blocks transmission of the steering torque applied from the steering assist device 106 to the vehicle steering device 30. Even after the intervention is finished, the first selector 112 blocks the transmission line until a preset time elapses from the immediately preceding intervention. Then, after it is determined that there is no intervention and a preset time has elapsed from the immediately preceding intervention, the first selector 112 connects the transmission line and transmits the steering torque applied from the steering assist device 106 to the vehicle steering device 30.

The state machine 114 manages the driving mode of the vehicle 2. The state machine 114 is notified of the determination result of the presence or absence of intervention by the driver from the intervention determination device 110, and is notified of the operation state of the autonomous driving device 104 from the autonomous driving device 104. When it is continuously determined that the autonomous driving device 104 is operating normally and there is no intervention by the driver, the state machine 114 determines the driving mode to be the autonomous driving mode. When it is determined that there is intervention by the driver and when the autonomous driving device 104 is not normally operating, the state machine 114 determines the driving mode to be the manual driving mode. The state machine 114 notifies the second selector 116 of the determined operation mode.

The second selector 116 switches the connection to the vehicle driving device 118 between the autonomous driving device 104 and the vehicle steering device 30 according to the driving mode notified from the state machine 114. When the notified driving mode is the manual driving mode, the second selector 116 connects the vehicle steering device 30 to the vehicle driving device 118. When the notified driving mode is the autonomous driving mode, the second selector 116 connects the autonomous driving device 104 to the vehicle driving device 118.

4. Configuration of Vehicle

Figure 6:
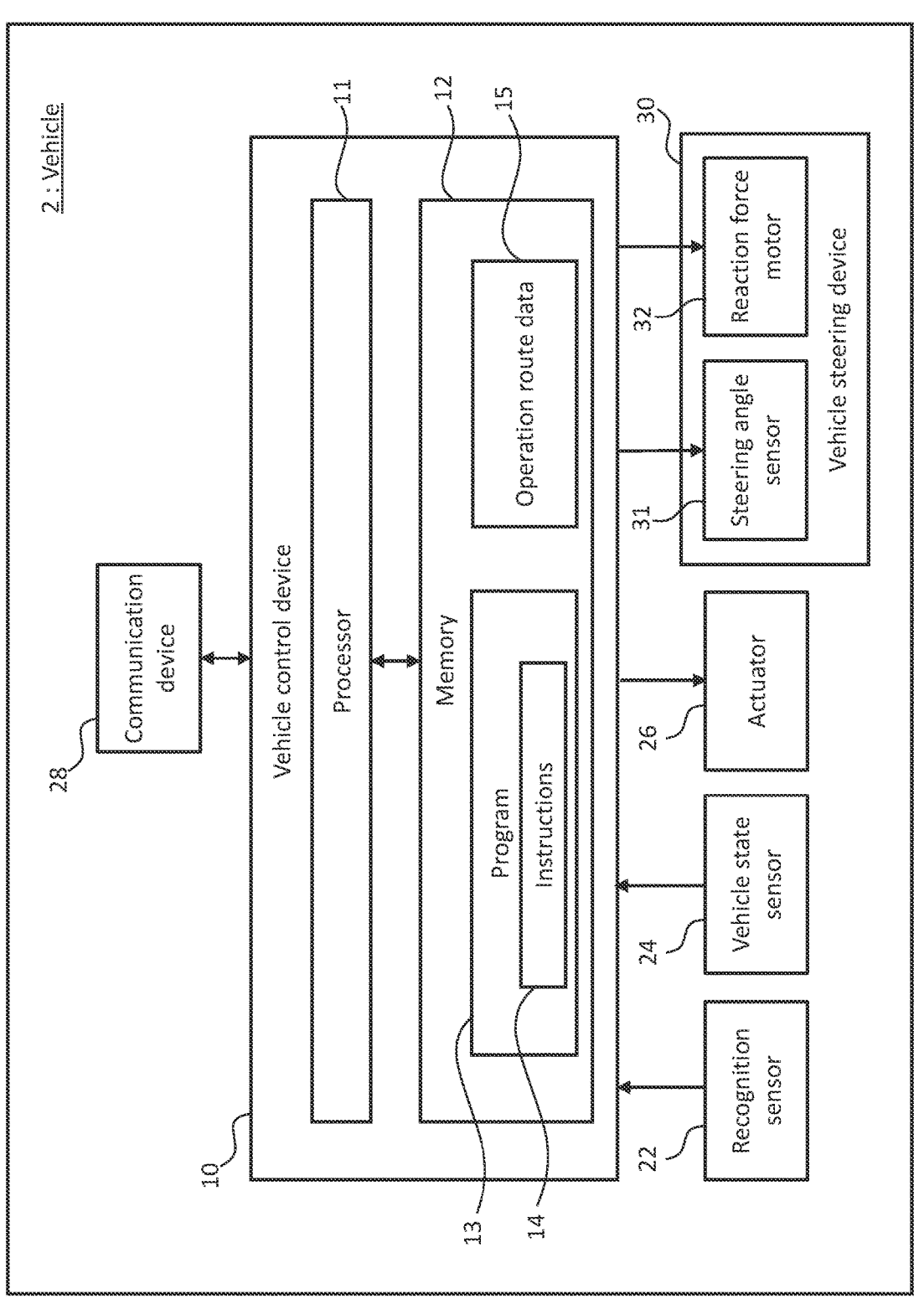
FIG. 6 is a block diagram illustrating a configuration of a vehicle to which the vehicle controller according to the embodiment of the present disclosure is applied.

Finally, an example of a configuration of the vehicle 2 on which the vehicle controller 10 is mounted will be described. FIG. 6 is a block diagram illustrating an example of a configuration of the vehicle 2. In addition to the vehicle controller 10, a recognition sensor 22, a vehicle state sensor 24, an actuator 26, a communication device 28, and a vehicle steering device 30 are mounted on the vehicle 2. These components are connected to the vehicle controller 10 using an in-vehicle network.

The vehicle controller 10 includes at least one processor 11 (hereinafter simply referred to as a processor 11). The processor 11 may be, for example, a CPU, an FPGA, or an ASIC. Alternatively, the processor 11 may be a combination of two or more of a CPU, an FPGA, and an ASIC.

The vehicle controller 10 includes at least one memory 12 (hereinafter simply referred to as a memory 12) communicatively coupled to the processor 11. The memory 12 stores at least one program 13 (hereinafter, simply referred to as a program 13) executable by the processor 11 and various data including operation route data 15. The program 13 comprises a plurality of executable instructions 14. When the processor 11 executes the program 13, various processes by the processor 11 are implemented. The instructions 14 includes instructions for implementing the vehicle control method according to the present embodiment.

The recognition sensor 22 is a sensor that acquires information for recognizing a situation around the vehicle 2. The recognition sensor 22 includes at least a camera that captures an image in front of the vehicle 2. The vehicle state sensor 24 is a sensor that acquires information related to the posture and motion of the vehicle 2. The actuator 26 includes a steering actuator that steers the vehicle 2, a driving actuator that drives the vehicle 2, and a braking actuator that brakes the vehicle 2. The communication device 28 is a device that controls wireless communication between the vehicle 2 and the outside. The communication device 28 communicates with the management server via a communication network. The vehicle steering device 30 is an input device used by the driver to steer the vehicle 2, and is typically a steering mechanism including the steering wheel 4. The vehicle steering device 30 includes a steering angle sensor 31 that acquires a steering angle of the steering wheel 4 and a reaction force motor 32 that applies steering torque to the steering wheel 4.

5. Other Embodiments

Instead of the method of generating the operation route on board by the navigation device, a method of acquiring the operation route from the management server by wireless communication may be used. That is, the operation route data 15 illustrated in FIG. 6 may be generated by calculation in the vehicle controller 10 or may be acquired from the outside via the communication device 28.

When the driver intervenes in the steering in the autonomous driving, a moving distance from the time point of the intervention may be measured instead of the elapsed time from the time point of the intervention. That is, the generation of the steering torque in the direction of returning the vehicle to the operation route may be suppressed until the vehicle moves a preset distance from the detection of the intervention. Specifically, absolute coordinates such as waypoints may be stored as map information, and the generation timing of the steering torque may be determined based on the map information.

In the manual driving mode, at least the steering may be manual. That is, in the manual driving mode, driving and braking of the vehicle 2 may be autonomously performed.

What is claimed is:

1. A controller for controlling a vehicle, comprising:
at least one processor; and
a memory communicatively coupled to the at least one processor, the memory storing a plurality of executable instructions configured to cause the at least one processor to execute acquiring a preset operation route;
causing the vehicle to travel along the preset operation route in one of an autonomous driving mode in which the vehicle is operated by autonomous driving and a manual driving mode in which the vehicle is operated by manual driving in which at least steering is manually performed;
determining whether a driving mode of the vehicle is the manual driving mode;
upon determination that the driving mode of the vehicle is the manual driving mode, determining whether a preset time has elapsed since a previous intervention by the driver in the steering of the vehicle;
upon determination that the preset time has elapsed since the previous intervention by the driver in the steering of the vehicle, acquiring a steering amount of a steering wheel of the vehicle;
calculating an expected value of the steering amount based on a road shape of the operation route and a current attitude of the vehicle;
comparing the steering amount of the vehicle to the expected value of the steering amount;
upon determination that the steering amount of the vehicle is smaller than the expected value of the steering amount, generating torque for guiding the steering operation of the vehicle so that the vehicle follows the operation route; and
upon determination that the steering amount of the vehicle is larger than the expected value of the steering amount, generating torque acting as steering resistance so that the vehicle follows the operation route.

2. The controller according to claim 1, wherein the plurality of executable instructions is configured to cause the at least one processor to further execute:

switching from the autonomous driving mode to the manual driving mode in response to detection of intervention in steering by a driver during operation in the autonomous driving mode, and suppressing generation of the steering torque in the direction of returning the vehicle to the preset operation route until a preset time elapses from the detection of the intervention or until the vehicle moves a preset distance from the detection of the intervention.

3. The controller according to claim 1, wherein the plurality of executable instructions is configured to cause the at least one processor to further execute:

acquiring the preset operation route from a server communicably connected by wireless communication.

4. A method for controlling a vehicle by a computer, the method comprising:

acquiring a preset operation route;

causing the vehicle to travel along the preset operation route in one of an autonomous driving mode in which the vehicle is operated by autonomous driving and a manual driving mode in which the vehicle is operated by manual driving in which at least steering is manually performed;

determining whether a driving mode of the vehicle is the manual driving mode;

upon determination that the driving mode of the vehicle is the manual driving mode, determining whether a preset time has elapsed since a previous intervention by the driver in the steering of the vehicle;

upon determination that the preset time has elapsed since the previous intervention by the driver in the steering of the vehicle, acquiring a steering amount of a steering wheel of the vehicle;

calculating an expected value of the steering amount based on a road shape of the operation route and a current attitude of the vehicle;

comparing the steering amount of the vehicle to the expected value of the steering amount;

upon determination that the steering amount of the vehicle is smaller than the expected value of the steering amount, generating torque for guiding the steering operation of the vehicle so that the vehicle follows the operation route; and upon determination that the steering amount of the vehicle is larger than the expected value of the steering amount, generating torque acting as steering resistance so that the vehicle follows the operation route.

5. A non-transitory computer-readable storage medium storing a program for causing a computer to execute processing for controlling a vehicle, the processing comprising:

acquiring a preset operation route;

causing the vehicle to travel along the preset operation route in one of an autonomous driving mode in which the vehicle is operated by autonomous driving and a manual driving mode in which the vehicle is operated by manual driving in which at least steering is manually performed;

determining whether a driving mode of the vehicle is the manual driving mode;

upon determination that the driving mode of the vehicle is the manual driving mode, determining whether a preset time has elapsed since a previous intervention by the driver in the steering of the vehicle;

upon determination that the preset time has elapsed since the previous intervention by the driver in the steering of the vehicle, acquiring a steering amount of a steering wheel of the vehicle;

calculating an expected value of the steering amount based on a road shape of the operation route and a current attitude of the vehicle;

comparing the steering amount of the vehicle to the expected value of the steering amount;

upon determination that the steering amount of the vehicle is smaller than the expected value of the steering amount, generating torque for guiding the steering operation of the vehicle so that the vehicle follows the operation route; and upon determination that the steering amount of the vehicle is larger than the expected value of the steering amount, generating torque acting as steering resistance so that the vehicle follows the operation route.

\* \* \* \* \*